United States Patent [19]
Orikawa et al.

[11] Patent Number: 4,838,529
[45] Date of Patent: Jun. 13, 1989

[54] LIQUID-FILLED VIBRATION ISOLATING DEVICES

[75] Inventors: Michihiro Orikawa; Takeshi Noguchi, both of Yokohama, Japan

[73] Assignee: Bridgestone Corporation, Japan

[21] Appl. No.: 931,823

[22] Filed: Nov. 18, 1986

[30] Foreign Application Priority Data

Nov. 18, 1985 [JP] Japan .................. 60-256801

[51] Int. Cl.[4] ............................ F16F 5/00; F16F 9/34
[52] U.S. Cl. ................................ 267/140.1; 248/562
[58] Field of Search ............. 267/140.1, 140.3, 140.4, 267/140.5, 141, 141.1, 141.2, 141.3, 141.4, 141.5, 35, 259, 219; 180/300, 312, 902; 248/562, 636

[56] References Cited

U.S. PATENT DOCUMENTS

| | | | |
|---|---|---|---|
| 2,417,096 | 3/1947 | Thiry | 267/140.1 |
| 2,421,585 | 6/1947 | Thiry | 267/140.1 |
| 4,588,174 | 5/1986 | Konishi | 267/35 X |
| 4,647,023 | 3/1987 | Roy et al. | 267/140.1 X |
| 4,690,389 | 9/1987 | West | 267/140.1 |

FOREIGN PATENT DOCUMENTS

| | | | |
|---|---|---|---|
| 3316025 | 11/1984 | Fed. Rep. of Germany | 180/200 |
| 3423698 | 1/1985 | Fed. Rep. of Germany | 267/140.1 |
| 0179542 | 9/1985 | Japan | 267/140.1 |
| 0059034 | 3/1986 | Japan | 267/140.1 |

*Primary Examiner*—Andres Kashnikow
*Assistant Examiner*—Richard Potosnak
*Attorney, Agent, or Firm*—Sughrue, Mion, Zinn, Macpeak & Seas

[57] ABSTRACT

A liquid-filled vibration isolating device comprises a central member, an outer sleeve, an elastic member interposed between the central member and the outer sleeve, at least two liquid chambers defined among them and filled with a liquid, a restricted passage communicating the liquid chambers with each other and a stopper protruding from the central member toward the liquid chamber. In this device, a through-hole is arranged so as to open to the liquid chambers through the stoppers, and a vibration member is disposed in the through-hole, whereby high frequency, small amplitude vibrations can sufficiently be absorbed in addition to the effective damping of low frequency, large amplitude vibrations.

4 Claims, 3 Drawing Sheets

FIG_1a
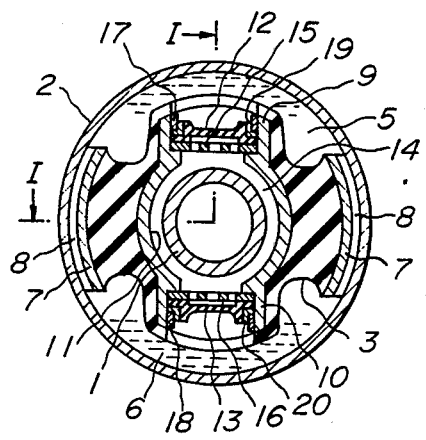
FIG_1b
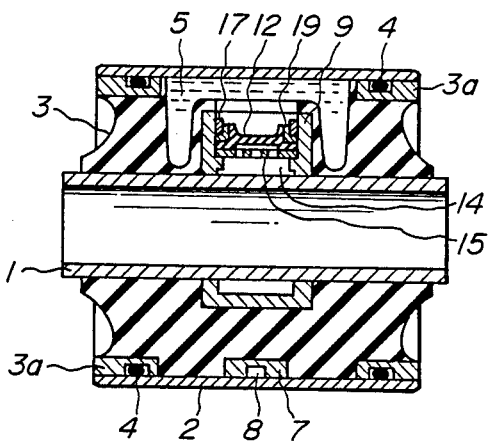
FIG_1c
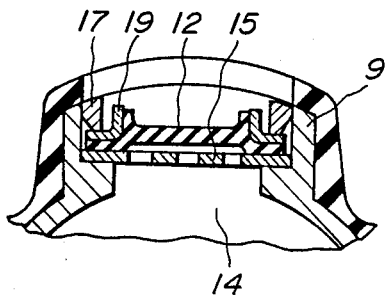

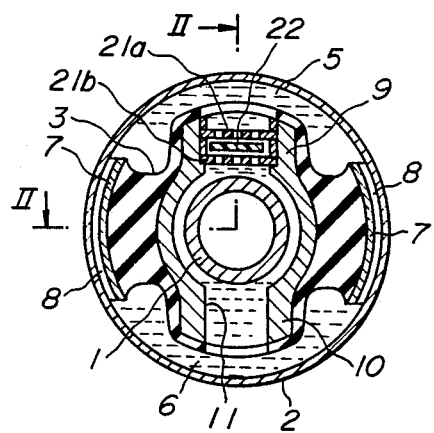
FIG_2a
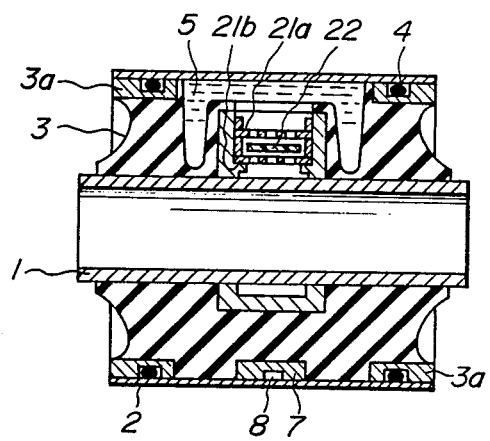
FIG_2b
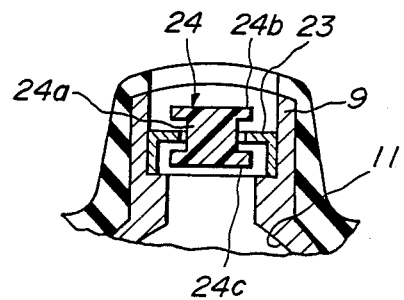
FIG_3

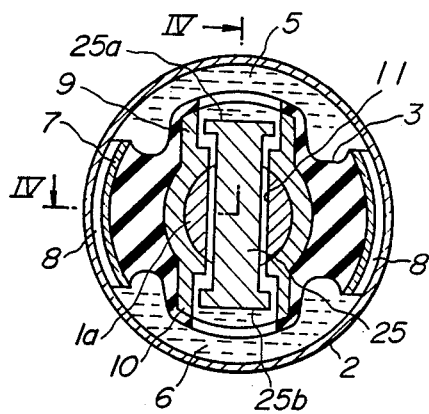
FIG_4a
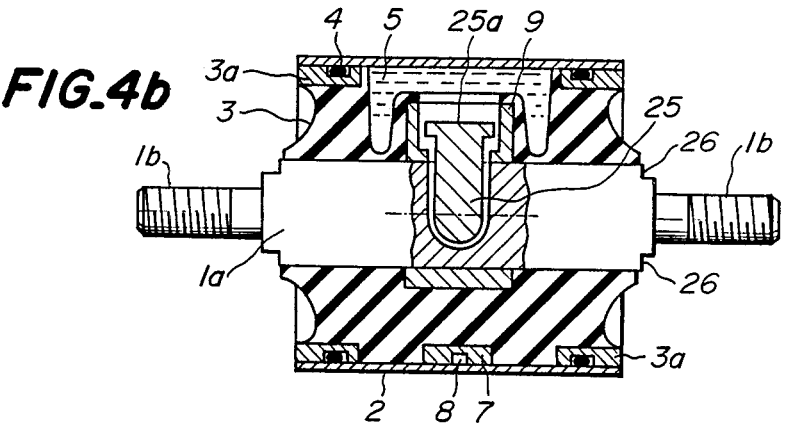
FIG_4b
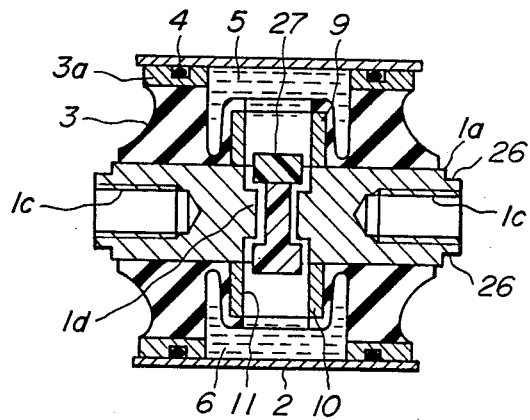
FIG_5

LIQUID-FILLED VIBRATION ISOLATING DEVICES

BACKGROUND OF THE INVENTION

1. Field of the Invention

This invention relates to a liquid-filled vibration isolating device or a so-called bush-type liquid-filled vibration isolating device suitable as an elastic bushing, an engine mount, a carburetor mount or the like, which serves to not only effectively damp low frequency, large amplitude vibrations but also sufficiently absorb high frequency, small amplitude vibrations from a vibration source.

2. Related Art Statement

In this type of the liquid-filled vibrations isolating device, there has hitherto been used, for example, a vibration isolating device comprising high-rigidity inner and outer sleeves concentrically arranged to each other, a rubber elastomer connecting the sleeves to each other, two liquid chambers formed in the rubber elastomer at its center in the axial direction and at opposite positions in the radial direction and filled with an imcomprenssible liquid, and at least one restricted passage communicating both liquid chambers with each other.

In such a vibration isolating device, when the vibration transmitted to the device is particularly low frequency, large amplitude vibrations (for example, vibrations with a frequency of less than 50 Hz and an amplitude of about ±1 mm), it can effectively be damped by converting kinetic energy of liquid into heat energy through flow resistance subjected to the liquid when the liquid flows from one of the liquid chambers to the other through the restricted passage.

In the conventional vibration isolating device, however, when the sectional area and length of the restricted passage communicating the liquid chambers with each other are selected so as to sufficiently damp vibrations in the low frequency range, the restricted passage is rendered into a choked state by inertia force, friction force and the like of liquid inside the restricted passage based on vibrations of relatively lower frequency in the high frequency range to thereby cause a rapid increase of dynamic spring rate, and consequently the insulation and damping of vibrations of higher frequency can hardly be expected.

On the other hand, when the dimension of the restricted passage is determined so as to sufficiently damp vibrations of high frequency zone, the damping of low frequency vibrations can not be expected.

SUMMARY OF THE INVENTION

It is, therefore, an object of the invention to provide a liquid-filled vibration isolating device which can produce the sufficient damping of low frequency, large amplitude vibrations and also can effectively restrain the increase of dynamic spring rate on high frequency, small amplitude vibrations.

According to the invention, there is the provision of in a liquid-filled vibration isolating device comprising a central member serving, for example, as an inner sleeve, an outer sleeve concentrically arranged around the central member, an elastic member connecting the central member to the outer sleeve and composed mainly of rubber, rubbery elastomeric material, synthetic resin or the like, at least two liquid chambers defined among the central member, elastic member and outer sleeve at certain intervals in the circumferential direction and filled with an incompressible liquid, a restricted passage communicating these liquid chambers with each other and a stopper protruding from the central member toward each liquid chamber, the improvement wherein a through-hole opening to the liquid chambers through the stoppers is arranged in the device and a vibration member displacing in accordance with the difference in internal pressure between the liquid chambers is disposed in the through-hole.

In the vibration isolating device according to the invention, when low frequency, large amplitude vibrations are transmitted to the device, an external force acts in such a direction that one of the liquid chambers is compressed and the other liquid chamber is enlarged, so that the vibrations are sufficiently and effectively damped by the action of restricted passage when the liquid flows from one liquid chamber to the other liquid chamber through the restricted passage under the displacement of the vibration member.

On the other hand, when high frequency, small amplitude vibrations are transmitted to the vibration isolating device, if the restricted passage is rendered into a choked state, the flowing of the liquid in the restricted passage is substantially impossible, but the vibration member is displaced in the through-hole in accordance with the increase or decrease of internal pressure at each liquid chamber, whereby the increase of internal pressure in the liquid chamber is effectively prevented and consequently the increase of dynamic spring rate resulting from this vibration is sufficiently restrained.

BRIEF DESCRIPTION OF THE DRAWINGS

The invention will be described with respect to the accompanying drawings, wherein:

FIGS. 1a to 1c illustrate a first embodiment of the liquid-filled vibration isolating device according to the invention;

FIGS. 2a to 2b illustrate a second embodiment of the liquid-filled vibration isolating device according to the invention;

FIG. 3 is a partially sectional view of a main part of a vibration member used in the invention;

FIGS. 4a to 4b illustrate a third embodiment of the liquid-filled vibration isolating device according to the invention; and FIG. 5 is a sectional view of a fourth embodiment of the liquid-filled vibration isolating device according to the invention.

Like parts are designated by like numerals through the different figures of the drawing.

DESCRIPTION OF THE PREFERRED EMBODIMENTS

In FIGS. 1a and 1b is sectionally shown a first embodiment of the vibration isolating device according to the invention, wherein numerals 1 and 2 are an inner sleeve and an outer sleeve each made from a rigid material such as metal, synthetic resin or the like, respectively, which are concentrically arranged and connected to each other through an elastic member 3.

The elastic member 3 may be composed mainly of rubber, rubbery elastomeric material, synthetic resin or the like and has a substantially cylindrical form as a whole. The elastic member 3 is provided at the outer peripheral portion with a pair of intermediate rings 3a, 3a separated away from each other in the axial direction. The inner and outer sleeves 1 and 2 communicate with each other through the elastic member 3 by bonding the inner surface of the elastic member 3 to the inner sleeve 1 through vulcanization or the like and fixing the outer sleeve 2 to the elastic member 3 through O-rings 4, 4 arranged in the grooves of the intermediate rings 3a, 3a by the caulking of the outer sleeve 2.

Moreover, the elastic member 3 may be composed of rubber or synthetic resin alone and may be provided with an intermediate cylinder extending over the whole length of the elastic member 3 instead of the intermediate rings 3a, 3a.

Two liquid chambers 5, 6 are defined by the inner sleeve 1, outer sleeve 2 and elastic member 3 at a center in the axial direction and at opposite positions in the radial direction and filled with an incompressible liquid having a required kinematic viscosity coefficient. The liquid chambers 5, 6 are communicated with each other through two restricted passages 8, 8 defined by circumferential grooves of two rigid arc bodies 7, 7, which are bonded to or inserted into the outer surface of the elastic member 3 between the intermediate rings 3a, 3a, together with the inner surface of the outer sleeve 2.

At least one of these restricted passages 8, 8 may be formed in the interior of the elastic member 3 composed mainly of rubber or the like. Further, the length of the restricted passage may properly be changed by meandering these passages in the axial direction of the inner and outer sleeves 1, 2 or the like. Moreover, only a single restricted passage may be used as far as it has a required sectional area.

Numerals 9 and 10 are stoppers each protruding radially outward in each of the liquid chambers 5, 6. For instance, as shown in FIGS. 1a and 1b, a rigid block may be fitted into and fixed to the inner sleeve 1 at a given position to form these stoppers. Preferably, the stoppers 9 and 10 act to prevent excessive relative displacement of the inner and outer sleeves 1, 2 under a cushioning action of an elastomeric coating formed on the front end surface of each of the stoppers 9, 10.

A through-hole 11 is formed in the rigid block so as to detour around the inner sleeve 1 and open to each of the liquid chambers 5, 6 through each of the stoppers 9, 10. Each opening end portion of the through-hole 11 is closed with a flexible diaphragm 12 or 13 as an embodiment of a vibration member. The space of the through-hole 11 closed with the flexible diaphragms 12 and 13 functions as a fluid chamber 14 by filling with a gas or a liquid.

As enlargedly shown in FIG. 1c, the attachment of the flexible diaphragm 12 or 13 is carried out by fixing a perforated plate 15 or 16 to the inner peripheral portion of the stopper 9 or 10 and directly pushing the flexible diaphragm 12 or 13 to the perforated plate 15 or 16 with a fixing ring 17 or 18 or indirectly pushing the flexible diaphragm to the perforated plate with the fixing ring through a support ring 19 or 20 for clamping force. The outer surface of the thus attached flexible diaphragm 12 or 13 comes into contact with the liquid in the liquid chamber somewhat creeping toward the through-hole.

In the vibration isolating device of the above structure, when low frequency, large amplitude vibrations are transmitted to the inner sleeve 1 or the outer sleeve 2, an external force acts in such a direction that one of the liquid chambers is compressed and the other is enlarged, and consequently the liquid in the compressed liquid chamber flows into the other liquid chamber through the two restricted passages 8, 8 under a displacement of the flexible diaphragms 12, 13. As a result, the kinetic energy of the flowing liquid is converted into the heat energy by the restricted passage 8, whereby the vibrations are damped sufficiently and effectively.

On the other hand, when high frequency, small amplitude vibrations are transmitted to the device, if the restricted passage 8 is rendered into choked state, the flexible diaphragms 12, 13 displace from high pressure side to low pressure side in the through-hole 11 in response to the tendency of increasing or decreasing the internal pressure of each liquid chamber to effectively suppress the increase of internal pressure in the liquid chamber, and consequently the increase of dynamic spring rate is sufficiently prevented.

Such a displacement of the flexible diaphragms 12, 13 is performed within a slight gap previously set between the perforated plate 15 or 16 and the flexible diaphragm 12 or 13 or within a given gap capable of sufficiently absorbing high frequency, small amplitude vibrations and securing the effective damping of low frequency, large amplitude vibrations. Particularly, the displacement of the flexible diaphragm is restricted by contact with the perforated plate.

In the embodiment of FIG. 1, when the liquid in the liquid chamber 14 is the same as in the liquid chamber 5, 6, the attachment of the flexible diaphragms 12, 13 is not necessarily required to have severe liquid-tightness, airtightness and the like. In this case, therefore, small holes having a sectional area sufficiently smaller than that of the restricted passage 8 may be formed in each of the flexible diaphragms 12 and 13. Preferably, such small holes are not overlapped with holes of the perforated plates 15 and 16.

In FIGS. 2a and 2b is sectionally shown a second embodiment of the liquid-filled vibration isolating device according to the invention, which is a modified embodiment of FIG. 1. That is, either of the flexible diaphragms and the perforated plates shown in FIG. 1a are omitted. For instance, the flexible diaphragm 13 and the perforated plate 16 arranged on the side of the liquid chamber 6 are omitted, while the flexible diaphragm 12 and the perforated plate 15 are replaced with an assembly of upper and lower perforated plates 21a and 21b and an oscillation plate arranged between these plates 21a and 21b. Therefore, both surfaces of the oscillation plate 22 come into contact with the liquid entering from the liquid chambers into the through-hole 11.

Both perforated plates 21a, 21b act to specify the upper limit of displacement amplitude or vibration amplitude of the oscillation plate 22 as an embodiment of the vibration member, which particularly secure the effective damping of low frequency, large amplitude vibrations. Further, the oscillation plate 22 is preferably composed of a low specific gravity material such as rubber, synthetic resin or the like, resulting in sensitive and smooth operation of the oscillation plate 22.

According to the embodiment of FIG. 2, the damping of low frequency, large amplitude vibrations is performed by the flowing of the liquid through the restricted passage 8, 8 likewise the embodiment shown in FIG. 1, while the insulation of high frequency, small amplitude vibrations transmitted to the inner sleeve 1 or outer sleeve 2 toward the other sleeve is performed by the vibration of the oscillation plate 22 between the perforated plates 21a and 21b.

In FIG. 3 is enlargedly shown a main part of another embodiment of the vibration member according to the invention, wherein a ring 23 having an inward flange is secured to an end portion of the through-hole 11 inside at least one stopper, the stopper 9 in the illustrated embodiment, and a vibration member 24 preferably composed of a low specific gravity material such as rubber, synthetic resin or the like is displaceably fitted in a hole formed in the inward flange of the ring 23.

The vibration member 24 comprises a cylindrical body 24a having a diameter smaller than the diameter of the hole in the inward flange of the ring 23, and flanges 24b, 24c formed on both ends of the cylindrical body 24a and contacting with the upper and lower surfaces of the inward flange of the ring 23. The vibration member 24 can displace within a range of contacting either one of the flanges with the inward flange of the ring 23 in response to the change of internal pressure inside the liquid chambers 5, 6 likewise the case using the oscillation plate 22 shown in FIG. 2.

In the embodiment of FIG. 3, therefore, high frequency, small amplitude vibrations can sufficiently be absorbed by the displacement of the vibration member 24.

In FIGS. 4 and 5 are sectionally shown the other embodiments of the liquid-filled vibration isolating device according to the invention, respectively. In the embodiment of FIG. 4, a solid rod 1a having male screw portions 1b, 1b at its both ends is used as a central member, and a through-hole 11 opening to the liquid chambers 5, 6 is arranged so as to linearly pass through the solid rod 1a and stoppers 9, 10, and a vibration member 25 is displaceably arranged in the through-hole 11 so as to extend over substantially the entire length of the through-hole. The vibration member 25 is preferably composed of a synthetic resin or low specific gravity material and has flanges 25a, 25b at its both ends. Such a vibration member 25 can displace in such a direction that either one of the flanges of the member 25 contacts with a shoulder portion in the through-hole based on the difference of liquid pressure acting on the surfaces of the flanges.

In the embodiment of FIG. 4, when a member of vibration source is fixed to the vibration isolating device by screwing it into the male screw portions 1b, 1b, relative displacement in torsional direction is apt to be caused between the solid rod 1a and the outer sleeve 2, so that it is favorable to arrange a rotation stopping means 26 such as groove, pin, hole or the like in the solid rod 1a (in the illustrated embodiment, each end portion of the solid rod 1a is machined into a flat surface at opposite positions in the radial direction).

In the embodiment of FIG. 5, female screw portions 1c, 1c are formed in both end portions of the solid rod 1a, while a vibration member 27 having a short length and provided at both ends with flanges is arranged in the through-hole 11, provided that the displacement of the vibration member 27 is restricted by a small diameter portion 1d protruding toward the through-hole.

The vibration members 25, 27 shown in FIGS. 4 and 5 have also substantially the same function as in the aforementioned embodiments, so that the increase of dynamic spring rate resulting from high frequency, small amplitude vibrations can sufficiently be restrained.

Moreover, in the embodiments shown in FIGS. 3 to 5, the restricted passage may be formed in the vibration member. In this case, it is unnecessary to attach the rigid arc body as shown in FIG. 1 to the outer peripheral surface of the elastic member 3.

Although the invention has been described with reference to the illustrated embodiments, the number of liquid chambers may be three or more.

According to the invention, not only low frequency, large amplitude vibrations can sufficiently be damped, but also the increase of internal pressure in the liquid chamber and hence the increase of dynamic spring rate in the device can effectively be restrained by displacing the vibration member arranged in the through-hole in response to the difference in internal pressure between the liquid chambers when high frequency, small amplitude vibrations are transmitted to the device.

What is claimed is:

1. A bush-type liquid-filled vibration isolating device comprising; a central member, an outer tubular sleeve arranged around the central member and having a circumferential direction, an elastic member connecting the central member to the outer tubular sleeve, at least two liquid chambers defined among the central member, elastic member and outer sleeve at intervals in said circumferential direction and filled with a liquid, a restricted passage communicating said liquid chambers with each other and a stopper means protruding from the central member toward each liquid chamber arranged at a position substantially separate from said elastic member in said circumferential direction to prevent excessive relative displacement of the central member and outer tubular sleeve, a through-hole opening to the liquid chambers through the stopper means arranged in the device and, a vibration member disposed in the through-hole and displaced in response to a difference in internal pressure between the liquid chambers.

2. The bush-type liquid-filled vibration isolating device according to claim 1, wherein said central member is a solid rod having threaded portions at its both ends, and said through-hole is arranged so as to linearly pass through said solid rod and stopper means and said vibration member having a section that extends substantially through said through-hole.

3. The bush-type liquid-filled vibration isolating device of claim 2, wherein said vibration member has flanges at each end of said section.

4. The bush-type liquid-filled vibration isolating device according to claim 1, further comprising rigid arcuate bodies arranged between said outer tubular sleeve and said elastic member and said restricted passage is arranged between said outer tubular sleeve and said rigid arcuate bodies.

* * * * *